United States Patent

[11] 3,594,584

| [72] | Inventor | Richard E. Woods<br>Markle, Ind. |
|---|---|---|
| [21] | Appl. No. | 756,931 |
| [22] | Filed | Sept. 3, 1968 |
| [45] | Patented | July 20, 1971 |
| [73] | Assignee | Franklin Electric Co., Inc.<br>Bluffton, Ind. |

[54] TELEMETRY CIRCUIT FOR AN AC POWER SYSTEM
16 Claims, 15 Drawing Figs.

[52] U.S. Cl. ............................................. 307/3,
340/310
[51] Int. Cl. ............................................. H02j 3/02
[50] Field of Search ............................................. 317/13, 32,
33, 28, 28.2; 307/106, 108, 96, 3, 117; 340/216,
310, 286, 345, 407, 310; 332/9

[56] References Cited
UNITED STATES PATENTS

| 2,177,843 | 10/1939 | Seeley .......................... | 340/310 UX |
| 3,011,102 | 11/1961 | Balan .......................... | 340/310 X |
| 3,378,829 | 4/1968 | Alafi et al. .......................... | 340/310 X |
| 3,460,121 | 8/1969 | Wattenburg.......................... | 340/310 X |
| 3,462,756 | 8/1969 | Mills.......................... | 340/310 |

Primary Examiner—Robert K. Schaefer
Assistant Examiner—H. J. Hohauser
Attorney—Hibben, Noyes & Bicknell ABSTRACT: This disclosure deals with an electric system including an alternating current power supply, at least a pair of power lines adapted to connect the power supply to a load, a pulse transmitter connected across the power lines, and a pulse detector connected to the power lines. The pulse transmitter includes a potential breakdown device and a potential storage device. As the AC potential across the two power lines, which is also the potential across the transmitter, changes, the breakdown device responds to the instantaneous potential drop across the power lines and fires. Either charging or discharging current then flows through the breakdown device and the storage device, such current flow resulting in a pulse appearing on the two power lines. This pulse is picked up by the detector.

TELEMETRY CIRCUIT FOR AN AC POWER SYSTEM

Electrical systems have been provided including an AC power circuit and a telemetry circuit which utilizes the power lines of the power circuit to carry signals. For example, E. J. Schaefer U.S. Pat. No. 3,327,167 discloses such a system. Another example of such a system is one wherein radio frequency signals are superposed on an AC power circuit for transmitting information or for triggering electrical devices connected to the power circuit.

While such prior art systems have worked well, they frequently have the disadvantage of being either too costly, too large, or too unreliable over a long period of time. In addition, a factor which prevents the use of certain types of telemetry circuits is the low-impedance loading of many AC power circuits. For example, a power circuit including a power transformer, supply lines and an electric motor has a relatively low impedance, and any telemetry circuit connected into such a power circuit must be capable of operating with such a low-impedance loading.

In accordance with the present invention, the foregoing difficulties are overcome by providing a telemetry circuit for use in an AC power circuit, said telemetry circuit including a pulse transmitter comprising a potential breakdown device and a potential storage device connected in series across a pair of power lines of the power circuit. As the instantaneous potential drop across the power lines changes, the breakdown device fires when the voltage drop thereacross reaches the breakdown or firing potential of the device. Current then flows through the transmitter, causing the storage device to either charge or discharge and the voltage drop across the breakdown device to fall to the point where it stops conducting. Such current flow through the transmitter results in a very narrow pulse appearing in the power circuit, which is picked up by the detector.

FUrther objects and advantages of the present invention will be apparent from the following detailed description taken in conjunction with the accompanying figures of the drawings, wherein.

Figure 1:
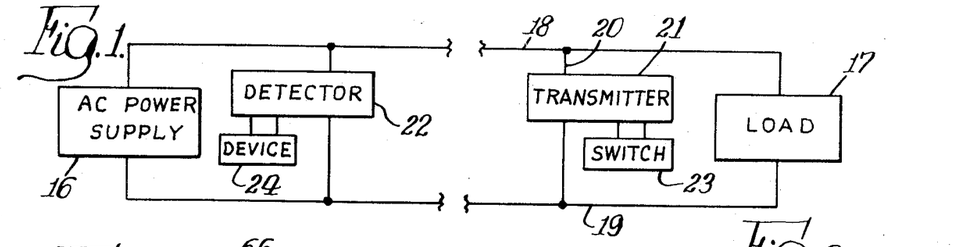
FIG. 1 is a block diagram of a system including a telemetry circuit embodying the invention.

The system shown in FIG. 1 comprises a conventional alternating current power supply 16 such as a power distribution transformer, a load 17 such as one or more electric motors, one or more household appliances, or a combination thereof, and two power lines 18 and 19 which connect the load 17 to the power supply 16 to form a power circuit. In addition, the system includes a transmitter 21 connected by a conductor 20 across the power lines 18 and 19, and a detector 22 also connected across the power lines. A switch 23 is connected to control energization of the transmitter 21 and a device 24 is connected to respond to or be actuated by the detector 22. Briefly, when alternating current from the power supply flows through the power circuit and the switch 23 energizes the transmitter 21, the transmitter 21 generates pulses which are superposed on the AC voltage on the power lines 18 and 19. The detector 22 responds to the pulses generated by the transmitter 21 and actuates the device 24.

The switch 23 may be a manually actuatable type or it may be constructed to automatically respond to an ambient physical condition. Examples of a manually actuatable type are a pushbutton switch or a switch in a burglar-detecting system which is actuated by a burglar when attempting to enter a house or building. Examples of an automatic switch are those which are automatically responsive to temperature, smoke, water, etc.

The device 24 may be an audible or visual alarm, a household appliance such as a coffee pot, a control circuit for disconnecting the load 17 from the power supply 16, etc.

A complete system may comprise an electric motor as the load 17, the switch 23 being constructed and located to respond to the temperature of the motor and energize the transmitter when the motor becomes overheated. In such a system, the device 24 may comprise an alarm or a relay for disconnecting the motor from the power supply in the event of overheating. An example of another complete system is one wherein the load 17 comprises one or more household appliances, the switch 23 automatically responds to a fire, smoke or burglars in the house, and the device 24 is an alarm or indicator of some sort. The power lines 18 and 19 in the latter system would be the usual electrical wiring system of the house, which is used to power the lights and other appliances of the house.

Figure 2:
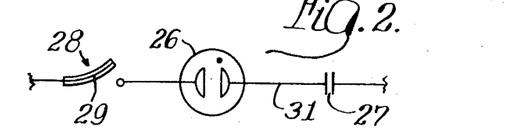
FIGS. 2 through 8 are schematic diagrams of alternate forms of a transmitter for use in the system shown in FIG. 1.

The construction of one form of the transmitter 21 is illustrated in FIG. 2 and comprises a potential breakdown device 26 and a potential storage device 27. In the form shown in FIG. 2, the potential breakdown device 26 comprises a neon lamp and the potential storage device 27 comprises a capacitor. The circuit shown in FIG. 2 also preferably includes a switch 28 for controlling energization of the transmitter, the switch in the present instance being shown as a temperature responsive switch having a bimetallic element 29. The switch 28, while it could be connected in parallel with the lamp 26, is herein shown as connected in series with the lamp 26 and the capacitor 27 by an electrical conductor 31 which corresponds to the conductor 20 and connects these elements across the two power lines 18 and 19.

To explain the operation of the circuit shown in FIG. 2, assume that the lamp 26 is a voltage-regulating neon lamp having a breakdown or firing voltage of approximately 200 volts and an extinguishing voltage of approximately 57 volts. A lamp known in the trade as a Signalite lamp 0A258 or 0T2-27-1W760 meets these specifications. The capacitor 27 in the present example is a 0.1 mfd. capacitor. The size of the capacitor should be such that it can be fully charged in a very short time, and it should be a nonpolar type of capacitor because it is connected across the AC power lines. Assume further that the alternating current power supply 16 produces a sine wave voltage having a peak-to-peak value of approximately 800 volts.

Figure 15:
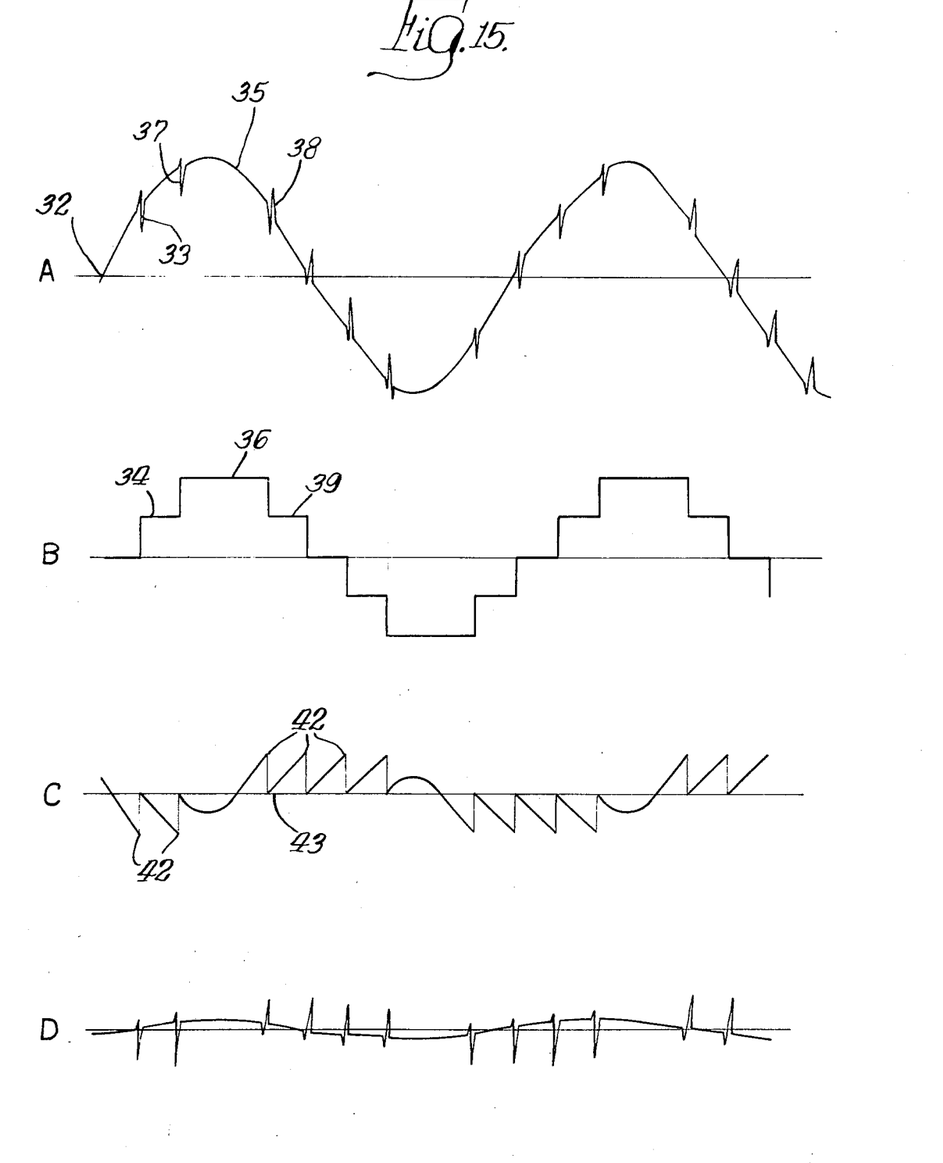
FIG. 15 is a schedule of wave forms illustrating the operation of a telemetry circuit embodying the invention.

With reference to waveform A in FIG. 15, the numeral 35 indicates a sine wave which represents the AC power supply voltage. Assume that the switch 28 closes at the time that the voltage is approximately at the point indicated by the numeral 32, this point being on approximately the zero voltage line and being on the rise side of the sine wave 35. No current flows through the transmitter at the point 32 because the voltage drop across the lamp 26 is not equal to its firing voltage of 200 volts. However, as the voltage increases on the rise side of the wave 35, the voltage across the transmitter rises to approximately 200 volts, at which time the lamp 26 fires or breaks down and conducts. Upon firing of the lamp 26, current flows through the lamp 26 and the capacitor 27, such current flow resulting in a pulse 33 which is superposed on the sine wave 35. The current flows through the transmitter until the capacitor 27 is charged to a voltage which is approximately equal to the difference between the firing and the extinguishing voltages of the neon lamp 26. In the present example, the capacitor 27 is charged in about 4 microseconds to approximately 143 volts and, simultaneously, the voltage across the neon lamp falls to approximately 57 volts. Waveform B in FIG. 15 represents the voltage drop across the capacitor 27, and waveform C represents the voltage drop across the neon lamp 26. When the voltage across the lamp 26 drops to 57 volts, the lamp 26 ceases to conduct and thus opens the circuit through the transmitter, thereby preventing the capacitor 27 from discharging. The voltage across the capacitor 27 consequently remains momentarily at the 143 volt level indicated by the numeral 34 in waveform B. THe voltage across the neon lamp 26, represented by waveform C, increases to a level indicated by the numeral 42 which is equal to the firing voltage of the neon lamp 26, and then this voltage falls to a level 43 which is equal to the extinguishing voltage of the lamp 26.

After the formation of the pulse 33, the sine wave 35 continues to increase on the rise side of the wave until the total voltage drop across the transmitter is equal to approximately 343 volts. The voltage across the capacitor is then still 143 volts and the voltage across the lamp has again risen to the 200 volt level, causing the neon lamp to again fire. A current pulse then again flows through the transmitter, charging the capacitor 27 to approximately 286 volts, represented by the level 36 in waveform B, and producing another pulse 37.

Thereafter, the voltage across the transmitter starts to fall on the trailing side of the sine wave, and when it falls to the level where the total drop across the transmitter minus the voltage drop across capacitor 27 equals 200 volts, the lamp 26 again fires. The capacitor 27 discharges to the level 39 in waveform B, and another pulse 38 is formed.

The foregoing operation is continuously repeated as long as the switch 28 is closed, thereby producing a train of pulses in the AC power circuit which are picked up by the detector 22. It is advantageous to have the firing and extinguishing voltages of the breakdown device as far apart as possible in order to obtain as much energy as possible in each pulse. While the magnitude of each pulse is determined by the characteristics of the breakdown device, the amount of energy in each pulse is determined by the capacitor, depending upon the length of time required to charge or discharge it. In addition to its obvious function of storing energy, the capacitor 27 also serves to limit the amount of current flowing through the lamp and it serves as a coupling element between the transmitter and the AC power lines. The breakdown device may be defined as an element which responds to the potential thereacross and experiences an abrupt increase in conductivity when the voltage thereacross reaches a given level.

As previously stated, waveforms A, B and C in FIG. 15 illustrate the conditions existing when the peak-to-peak value of the AC voltage appearing across the power supply lines 18 and 19 in approximately four times the value of the breakdown potential of the neon lamp. The total number of pulses generated by the transmitter in each AC cycle depends upon the value of the AC voltage relative to the breakdown and extinguishing voltages of the neon lamp. The following table illustrates the number of pulses generated in each AC cycle with different line voltages, all of the voltages given being RMS values. The table illustrates the operation of a circuit wherein the firing and extinguishing voltages of the lamp are 200 volts and 57 volts, and the capacitor is rated at 0.05 mfd. at 600 volts.

| Number of pulses | Line voltage | Voltage across capacitor | Voltage across lamp |
|---|---|---|---|
| 2 | 141 | 110 | 83 |
| 4 | 210 | 172 | 85 |
| 6 | 275 | 242 | 85 |
| 8 | 325 | 300 | 85 |
| 10 | 405 | 390 | 85 |
| 12 | 470 | 455 | 85 |

Figure 3:
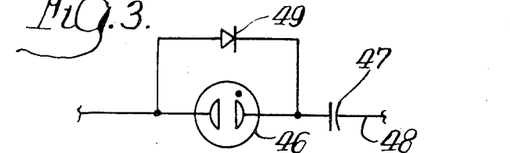

FIG. 3 illustrates a transmitter circuit which may be used in a relatively low voltage power circuit. The transmitter circuit shown in FIG. 3 comprises a neon lamp 46 having a firing voltage of, for example, 200 volts, a capacitor 47 connected in series with the neon lamp 46 by a conductor 48, and a diode 49 connected in parallel with the neon lamp 46. The conductor 48 corresponds to the conductor 20 in FIG. 1, and is adapted to connect the transmitter to the power lines 18 and 19. A switch similar to the switches 23 and 28 may be connected to the transmitter circuit shown in FIG. 3 to control operation of this transmitter.

With a power line voltage of 110 volts RMS, for example, a sine wave voltage having a peak-to-peak value of approximately 300 volts will appear across the transmitter. Assuming that the capacitor 47 is connected to the ground line, during the positive half cycle of each sine wave, the anode of the diode 49 is positive and the diode is biased to conduction. Current then flows through the diode 49 and the capacitor 47, charging the capacitor 47 to approximately the peak value of 150 volts. DUring the negative half cycle of each AC wave, the diode 49 is biased off. When the AC voltage becomes negative, the voltage drop across the lamp 46 is equal to the voltage of 150 volts to which the capacitor is charged, plus the AC line voltage, and when this sum rises to approximately 200 volts, the lamp 46 fires. The capacitor 47 discharges through the lamp 46 and a pulse is generated on the power lines 18 and 19. The transmitter shown in FIG. 3 will thus, in the example given, generate one pulse for each full cycle of the power line voltage. The capacitor 47 may, for example, be a 2 mfd. capacitor.

Figure 4:
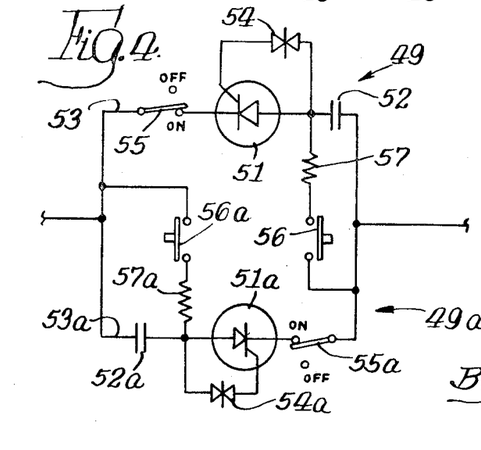

THe circuit shown in FIG. 4 comprises a pair of transmitters 49 and 49a, the transmitters respectively including silicon-controlled rectifiers (commonly referred to as "SCR") 51 and 51a connected in series with capacitors 52 and 52a by conductors 53 and 53a which correspond to the conductor 20 in FIG. 1. On-off switches 55 and 55a are connected in the conductors 53 and 53a to control operation of the transmitters 49 and 49a, respectively. Each transmitter shown in FIG. 4 further comprises a voltage responsive break-over device such as a neon lamp or a break-over device known in the trade as a "DIAC." In the present instance the transmitters 49 and 49a are respectively provided with DIACS 54 and 54a which are connected between the gates and the anodes of the respective SCRS. The characteristics of an SCR are of course such that, when the SCR is biased in the forward direction, a relatively small voltage appearing on the gate thereof will bias to the SCR to conduction, and the SCR will then continue to conduct, even though the gate signal is removed, until the anode current of the SCR is interrupted. A DIAC is a semiconductor that breaks down and conducts at, for example, 30 volts maximum in either direction, and thereafter the voltage drop across the DIAC falls to approximately zero as the DIAC continues to conduct. The conduction characteristics of a DIAC are the same for current flow in either direction. The characteristics of a DIAC are similar to those of a neon lamp, the principle differences being that the operating voltages of a DIAC are lower and it is a relatively low-power device.

In each transmitter circuit 49 and 49a, the combination of the SCR and the DIAC together form a breakdown device, the firing and extinguishing voltages of the device being determined primarily by the characteristics of the DIAC.

In the operation of the transmitters shown in FIG. 4, assume that the capacitor 52 is connected to the ground line and that both switches 55 and 55a are closed. The SCR 51 will be triggered to conduction as soon as the voltage on the cathode thereof becomes negative relative to ground and, further, when the voltage is greater than the break-over voltage of the DIAC 54. When the voltage across the transmitter 49 is greater than the DIAC 54 break-over voltage, the DIAC 54 conducts current and triggers the SCR 51 to conduction. The voltage drop across the DIAC 54 falls to substantially zero, the SCR 51 conducts current, the capacitor 52 is charged, and a pulse appears on the power lines. When the charge on the capacitor 52 reaches approximately the break-over voltage of the DIAC the SCR 51 ceases to conduct. The transmitter 49 will generate one or more pulses until the negative voltage peak is reached, the number of pulses depending upon the magnitude of the break-over voltage relative to the peak voltage.

Since the SCR 51 normally conducts current in only one direction, the transmitter 49 shown in FIG. 4 will normally generate pulses during the portion of only a single, AC cycle when the SCR 51 is forward biased and the voltage is increasing. However, when the polarity of the AC line voltage across the two transmitters reverses in the next half cycle, the transmitter 49a will be energized and generate a pulse. After the two transmitters have been energized in a sine wave cycle, the capacitors 52 and 52a will be prevented from discharging by the SCR 51 and the SCR 51a, and the charges on the capacitors will prevent the SCRs 51 and 51a from being triggered to conduction in subsequent cycles.

To discharge the two capacitors 52 and 52a for subsequent operation of the two transmitters, manual pushbutton switches 56 and 56a and resistors 57 and 57a are connected across the capacitors 52 and 52a, respectively. When the switches 56 and 56a are closed, the capacitors 52 and 52a discharge through the resistors 57 and 57a.

The transmitter shown in FIG. 4 should be used in a system which also includes two detectors, one detector being designed to respond to pulses generated in the negative half cycle by the transmitter 49 and the other responding to pulses generated in the positive half cycle by the transmitter 49a. Of course, if it is desired to operate with only one transmitter and detector, the switch 55 or 55a for that transmitter should be closed and the other switch 55 or 55a should be opened.

Figure 5:
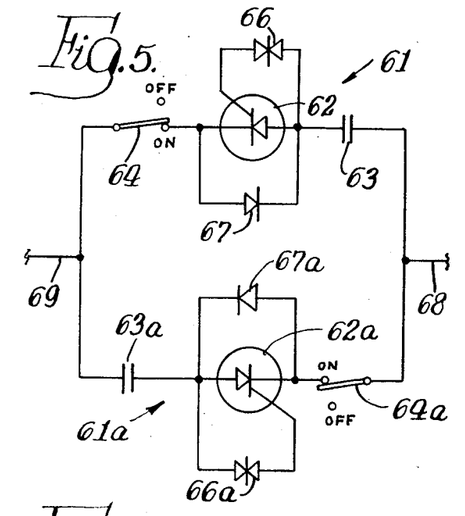

The circuit shown in FIG. 5 is generally similar in construction and operation to the circuit shown in FIG. 4 with the exception that the FIG. 5 circuit will generate a continuous train of pulses during a succession of sine waves, whereas the FIG. 4 circuit will generate a burst of pulses during only the first sine wave after it is energized. The circuit shown in FIG. 5 includes a pair of transmitters 61 and 61a, the transmitters respectively comprising SCRs 62 and 62a connected in series with capacitors 63 and 63a and on-off switches 64 and 64a. The SCRs 62 and 62a have DIACs 66 and 66a connected between the gates and the anodes thereof, and diodes 67 and 67a connected between the anodes and cathodes thereof. The two transmitters 61 and 61a are connected in parallel between two conductors 68 and 69, which correspond to the conductor 20 in FIG. 1.

In operation, assume that the switch 64a is closed, the conductor 68 is connected to the ground line, and the voltage on the conductor 69 is going negative. Referring first to the transmitter 61a, the negative voltage on the anode of the SCR 62a biases it off, but current flows through the oppositely connected diode 67a and charges the capacitor 63a to the peak voltage. Of course, when the SCR 62a is biased off and is bypassed by the diode 67a, a pulse will not be generated by the transmitter 61a. Subsequently, when the voltage on the conductor 69 goes positive, this voltage is added to the voltage to which the capacitor 63a is charged, similar to the operation of the FIG. 3 circuit, and when the break-over voltage of the DIAC 66a is reached the SCR 62a will be triggered into conduction. The diode 67a of course is biased off with this polarity voltage. The transmitter 61a will then generate pulses similar to one of the transmitters shown in FIG. 4, the number of pulses generated in each cycle by the transmitter 61a of course depending upon the magnitude of the break-over voltage of the DIAC 66a relative to the peak AC voltage. The foregoing operation is repeated in each AC cycle.

The operation of the transmitter 61 is similar to that of the transmitter 61a with the exception that the transmitter 61 will generate pulses on the opposite half cycle of each wave because the SCR 62 and the diode 67 are connected oppositely to the connections to the SCB 62a and the diode 67a. The two transmitters 61 and 61a will generate pulses during the opposite halves of each cycle as previously explained, but if it is desired to generate pulses during only the positive portion or during only the negative portion of each cycle, one of the two switches 64 and 64a may be closed and the other may be opened. The transmitters 61 and 61a should of course be used with two detectors which are constructed to respond to pulses generated during opposite half cycles.

Figure 6:
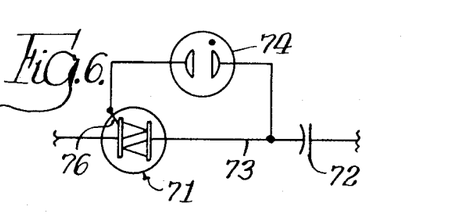

The transmitter shown in FIG. 6 also will generate a train of pulses during a continuous succession of sine waves. The transmitter shown in FIG. 6 comprises a semiconductor 71 known in the trade as a "TRIAC" and a capacitor 72 connected in series therewith by a conductor 73 which corresponds to the conductor 20 in FIG. 1. A break-over device such as a neon lamp 74 or a DIAC is connected between the gate 76 of the TRIAC 71 and a point between the TRIAC and the capacitor 72. Again, the combination of the TRIAC 71 and the neon lamp 74 forms a breakdown device. A switch (not shown) may be connected in circuit with the FIG. 6 transmitter to control operation thereof.

The TRIAC 71 has operating characteristics similar to those of the SCR 51 with the exception that, whereas an SCR will pass current in only one direction, a TRIAC will pass current in both directions. Thus, the transmitter shown in FIG. 6 will operate generally similarly to each transmitter shown in FIG. 4 but will generate pulses on both the rise side and the trailing side of each sine wave. Each time a voltage drop, of either polarity, equal to the firing voltage of the neon lamp 74 exists across the neon lamp, the lamp will fire and trigger the TRIAC to conduction. Charging current then flows through the capacitor 72, thus generating a pulse as previously explained.

Figure 7:
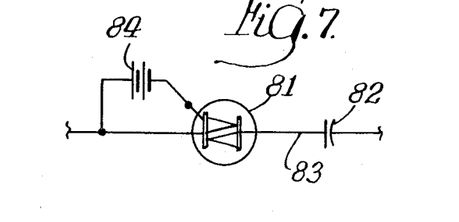

The transmitter shown in FIG. 7 comprises a TRIAC 81, a capacitor 82 connected in series with the TRIAC 81 by a conductor 83, and a battery 84 connected between the gate of the TRIAC 81 and the conductor 83, the negative terminal of the battery 84 being connected to the gate of the TRIAC. The positive terminal of the battery 84 is connected to the conductor 83 on the opposite side of the TRIAC from the capacitor 82.

A switch (not shown) may be connected in circuit with the FIG. 6 transmitter to control energization thereof. Assuming that the circuit through the TRIAC 81 is closed when the voltage sine wave is crossing the zero voltage line on the rise side of the wave, the TRIAC 81 will initially be nonconducting but it will be triggered to conduction as soon as the voltage drop thereacross, in combination with the DC voltage on the gate of the TRIAC, reaches the firing voltage of the TRIAC. At such time, the TRIAC will conduct, the capacitor 82 will be charged, and a pulse will be generated on the power line. Charging of the capacitor 82 results in a reduction in the voltage drop across the TRIAC to a point where it stops conducting, as previously explained. On the trailing side of the sine wave, the TRIAC will again be triggered to conduction, and thus discharge the capacitor 82, when the voltage drop across the TRIAC 81 reaches its firing voltage without regard to the polarity of the voltage drop across the TRIAC.

Figure 8:
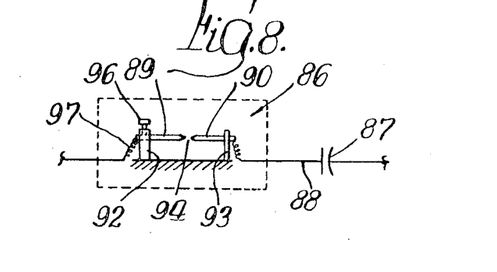

The transmitted circuit shown in FIG. 8 operates similarly to the transmitter circuit shown in FIG. 2 and may have a switch (not shown) connected in circuit therewith to control energization of this transmitter. The transmitter shown in FIG. 8 comprises a spark gap device 86, a capacitor 87, and a conductor 88 which connects the spark gap device 86 and the capacitor 87 in series and to the power lines 18 and 19. The spark gap device 86, such as the device known in the trade as Victoreen type VX-96, comprises a pair of axially aligned electrodes 89 and 90 mounted on supports 92 and 93. The electrodes 89 and 90 are electrically insulated from each other as by making the supports 92 and 93 out of an electrical insulating material. The two electrodes 89 and 90 are also preferably mounted for relative movement on their common axis toward and away from each other so that the length of a gap 94 between the adjacent ends of the electrodes may be varied. In the present instance, the electrode 89 is movably positioned within a hole formed through the support 92, and a setscrew 96 is provided to hold the electrode 89 at an adjusted position relative to the support 92. The electrical connections between the electrodes 89 and 90 and the conductor 88 preferably includes flexible leads 97 which permit adjustment of the relative positions of the two electrodes 89 and 90.

During the operation of the transmitter shown in FIG. 8, the transmitter is nonconducting when the voltage drop thereacross is relatively low. However, as soon as the voltage drop across the device 86 is sufficient to cause arcing across the gap 94, current will flow through the device 86 and charge the capacitor 87 until the voltage appearing across the gap 94 falls to the point where a spark can no longer be maintained. At such time, the device 86 ceases to conduct and remains nonconducting until the voltage drop thereacross once again rises to the point where an arc forms between the two electrodes 89 and 90. The operation of the transmitter shown in FIG. 8 is of course the same regardless of the polarity of the voltage across the transmitter.

Figures 9, 10, 11:
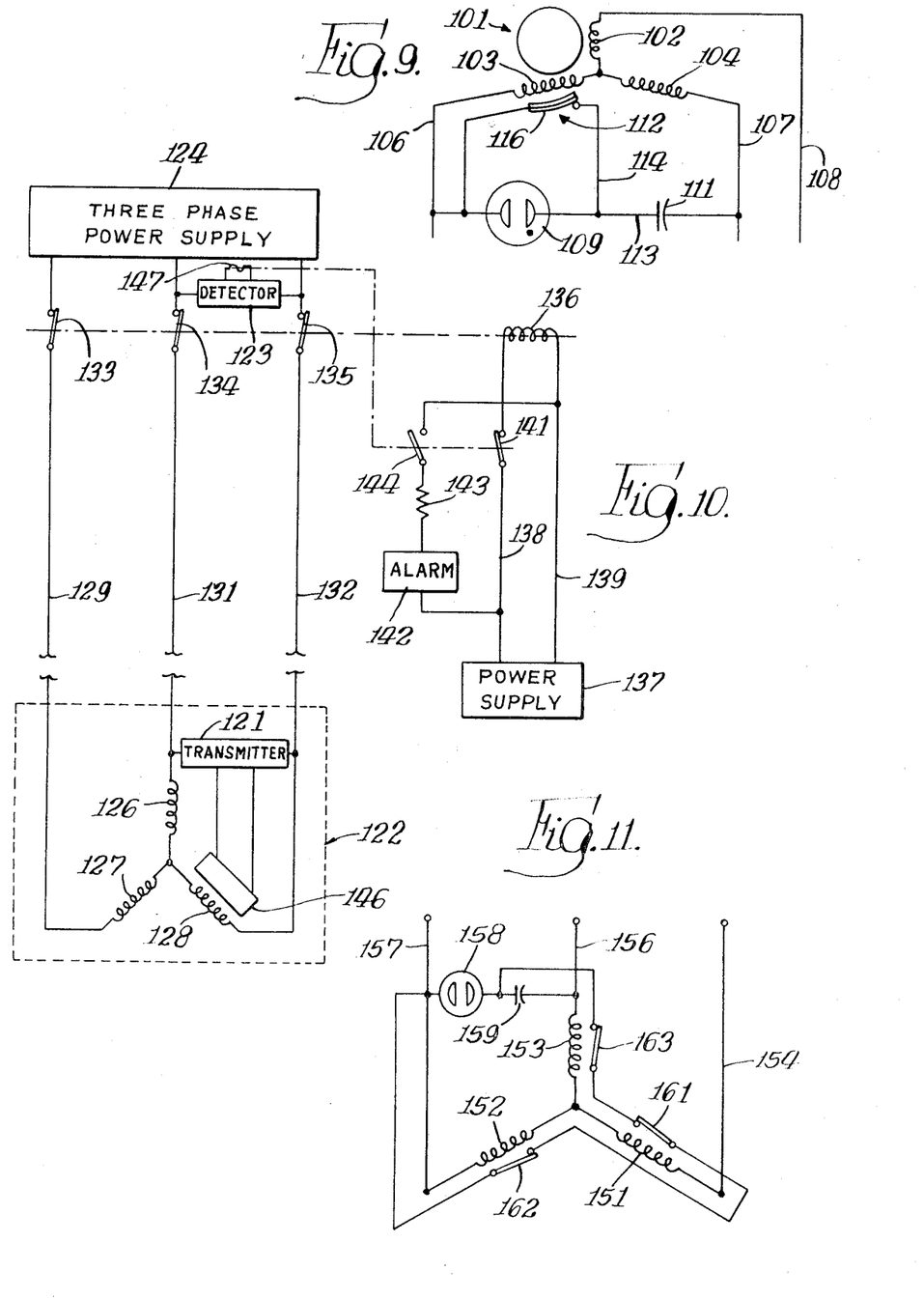
FIGS. 9 and 11 are schematic diagrams of a portion of a three-phase system including a telemetry circuit embodying the invention.
FIG. 10 is a schematic diagram of a complete three-phase power system including a telemetry circuit embodying the invention.

FIG. 9 illustrates the connection of a transmitter to the power lines which supply a three-phase load such as a three-phase electric motor 101. The motor 101 includes three-phase windings 102, 103 and 104 which are connected by the three power lines 106, 107 and 108 to a three-phase power supply (not shown). The transmitter is connected across two of the three power lines, and in the present instance it is shown as connected across power lines 106 and 107. Since the transmitter utilizes only two power lines, it is of course also suitable for use in a single phase system. The transmitter comprises a neon limp 109 and a capacitor 111, and a normally closed temperature responsive electrical switch 112 is connected in circuit with the transmitter to control energization thereof. A conductor 113 connects the neon lamp 109 and the capacitor 111 in series across the two power lines 106 and 107, and another conductor 114 connects the switch 112 in parallel with the neon lamp 109.

The switch 112 may be any temperature responsive switch, and in the present instance it is of a type including a bimetallic temperature responsive element 116 which flexes to open the switch at a predetermined temperature. The bimetallic element 116 of the switch 112 is positioned in heat transfer relation with one of the windings 102, 103 and 104 so that the condition of the switch 112, whether open or closed, is an indication of whether the temperature of the associated winding is above or below a predetermined temperature. In the present instance the element 116 is positioned adjacent the winding 103. The switch 112 is preferably constructed to open at a temperature which is considered dangerously high for the motor 101.

Assuming that the temperature of the motor 101 and the switch 112 is below the predetermined temperature, the switch is closed, AC current flows through the switch 112 and the capacitor 111, and the switch 112 shorts out the lamp 109. In the event the temperature rises above the predetermined temperature referred to above, the switch 112 opens and places the lamp 109 in a series circuit with the capacitor 111. Thereafter, operation of the transmitter shown in FIG. 9 is similar to the operation of the transmitter shown in FIG. 2. A train of pulses will flow through the power lines 106 and 107, the two windings 103 and 104, and the power supply (not shown). A detector used in the circuit shown in FIG. 9 is preferably connected across the two power lines 106 and 107 so that both the transmitter and the receiver utilize the same two power lines. However, a detector connected between the power lines 107 and 108 would detect pulses generated on the power lines 106 and 107 if the capacitor 111 were very large. Such a capacitor would produce high energy pulses which would appear on the power lines 106 and 107 because of cross coupling between the windings of the power transformer.

FIG. 10 illustrates a complete three-phase AC system wherein a transmitter 121 is positioned to respond to the temperature of an AC load 122, such as an electric motor, and a detector 123 is arranged to effect a disconnection of the motor 122 from a power supply 124 in the event the temperature of the motor 122 rises above a predetermined level. The motor 122 includes windings 126, 127 and 128 connected together and to three power lines 129, 131 and 132 which connect the three windings 126, 127 and 128 to the three-phase power supply 124. Three normally open power switches 133, 134 and 135 are connected in the lines 129, 131 and 132, respectively, between the supply 124 and the load 122, these three switches controlling the application of power to the load 122. The three switches 133, 134 and 135 are mechanically connected to the plunger of a relay which also includes a relay winding 136. The relay winding 136 is connected in a control circuit further including a power supply 137, which may be either AC or DC, two conductors 138 and 139, and a normally closed switch 141 which is connected in the conductor 138. The connections are such that, when the switch 141 is closed, the winding 136 will be energized by the supply 137 and the three switches 133, 134 and 135 will be closed. An alarm 142, which may for example be an audible or a visual alarm, is connected across the two conductors 138 and 139 in series with a current limiting resistor 143 and a normally open switch 144. The two switches 141 and 144 are mechanically connected to be actuated simultaneously by the detector circuit 124 as will be explained hereafter.

The transmitter circuit 121, which may be one of the above described types, is connected across the two power lines 131 and 132. A switch 146 is connected in the transmitter circuit, this switch 146 being physically located such that it is responsive to the temperature of at least one of the windings 126, 127 and 128. In the present instance, this switch 146 is shown as being located adjacent the winding 128. Thus, if the temperature of the winding 128 rises above a predetermined value, the switch 146 is actuated to energize the transmitter 121 and cause one or more pulses to flow through the power lines 131 and 132, the windings 126 and 128, and the power supply 124. The detector 123 detects the presence of the pulse or pulses and energizes a device 147 which actuates the switch 141 into its open position and the switch 144 to its closed position. Opening of the switch 141 causes deenergization of the winding 136, and closure of the switch 144 causes the alarm 142 to be energized. Deenergization of the winding 136 in turn causes the three switches 133, 134 and 135 to open and disconnect the load 122 from the three-phase power supply 124. Thereafter, the load will remain deenergized until an operator corrects the cause of the overheating of the load 122 and resets the system.

As mentioned with regard to the description of FIG. 9, the thermal switch 112 is located adjacent one the winding 103, and therefore it will quickly respond to a rise in temperature of the winding 103 but it will not immediately respond to a rise in temperature of the windings 102 and 104. Consequently, the FIG. 9 arrangement will not provide protection against a "single phasing" condition where power is supplied to windings 102 and 104 but not to winding 103 because the latter winding, not being energized, will not overheat. The circuit arrangement shown on FIG. 11 is generally similar to that shown in FIG. 9 but is designed to provide protection against single phasing as described above.

The circuit shown in FIG. 11 comprises a three-phase load, such as an electric motor, including windings 151, 152 and 153, respectively, connected to three power lines 154, 156 and 157. The circuit also includes a transmitter comprising a neon lamp 158 and a capacitor 159 which are connected across the power lines 156 and 157. Three series connected thermal switches 161, 162 and 163 are connected across the neon lamp 158. The switches 161 to 163 are normally closed and short circuit the lamp 158. However, if any one of the three windings 151 to 153 should overheat, the associated switch would open and thereby activate the transmitter. The circuit shown in FIG. 11 will therefore provide single phasing protection because overheating of any of the windings will result in pulses being generated on the power lines 156 and 157.

Instead of providing three normally closed switches in parallel with the neon lamp as shown in FIG. 11, three normally open switches connected in parallel with each other and in series with the lamp and the capacitor could be provided and achieve similar results.

Figure 12:
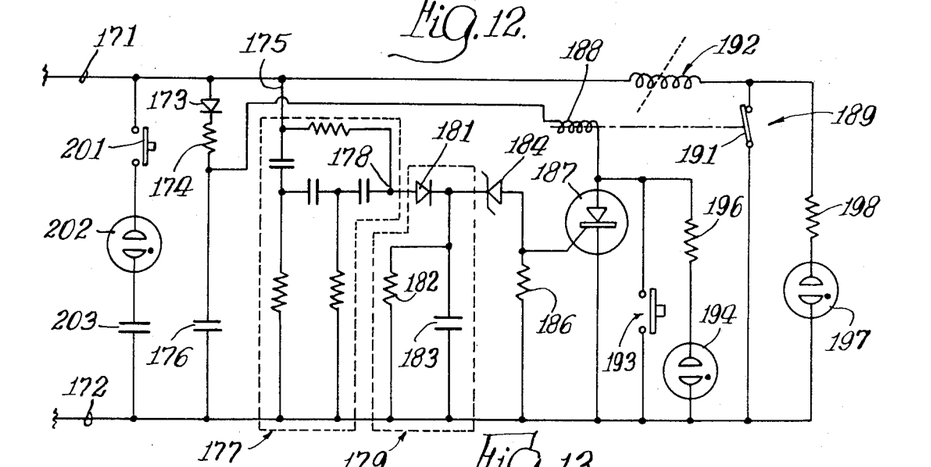
FIGS. 12 to 14 are schematic diagrams of detectors for use in a telemetry circuit embodying the invention.

A pulse detector is shown in FIG. 12 which is preferably used with a transmitter including a switch located adjacent each winding of a three-phase load described with regard to FIG. 11. The detector shown in FIG. 12 comprises a pair of conductors 171 and 172 which, in practice, are connected between two of the three power lines extending between a three-phase power supply and a three-phase load. As in the FIG. 10 system, the conductors 171 and 172 are preferably connected to the power lines on the power supply side of the main power contactors. Connected across the two conductors 171 and 172 are a rectifier 173, a resistor 174, and a capacitor 176, these three components providing half wave rectification of the power line voltage. Pulses generated by a transmitter appear on the two power lines and on the conductors 171 and 172, and these signals pass through a conductor 175 and a conventional notch filter 177 which is tuned to 60 c.p.s. With reference to FIG. 15 the signal appearing across the conductors 171 and 172 is represented by waveform A, and the signal at the output 178 of the filter 177 is represented by waveform D. From waveform D it will be apparent that the 60 c.p.s. sine wave is substantially filtered out whereas the pulses from the transmitter pass through the filter 177 with little or no attenuation.

The train of pulses passing through the filter 177 are connected to an integrator circuit 179 which consists of a diode 181, a resistor 182 and a capacitor 183. The diode 181 passes only the positive portions of the pulses, and these positive portions are integrated and stored on the capacitor 183. The resistor 182 is connected in parallel with the capacitor 183 and bleeds off any charge on the capacitor 183 which may accumulate due to transients appearing on the conductors 171 and 172. The output of the integrator circuit 179 is connected to a potential threshold circuit including a Zener diode 184 and a resistor 186, the junction between the Zener diode 184 and the resistor 186 being connected to the gate of an SCR 187. The cathode and the anode of the SCR 187 are connected across the output of the previously mentioned rectifier. Consequently, when the charge on the capacitor 183 exceeds the threshold, or Zener, voltage of the diode 184, the diode 184 conducts, the SCR 187 is triggered to conduction, and current flows through the SCR and through the coil 188 of a relay 189 which is connected in series with the SCR. The relay 189 further includes contacts 191 which are connected across the two conductors 171 and 172 in series with the coil 192 of the power contactor connected to the power lines. To deenergize the SCR 187 once it has been triggered to conduction and the capacitor 183 has discharged, a normally open reset switch 193 is connected in parallel with the SCR. Thus, closing the switch 193 will short out the SCR 187 and stop conduction. A neon voltage regulator lamp 194 and a resistor 196 are connected in parallel with the SCR 187 to hold the peak voltage appearing across the SCR to a safe value regardless of line voltage.

The relay 189 is a single pole stabilized memory relay which is actuated from one condition to another by a current impulse through the coil 188 and it will remain in the latter condition until a subsequent current impulse is received. For example, one impulse turns the relay from closed to open and it will stay open with or without current flow. The next impulse turns it from open to closed and again it will stay there until the next impulse regardless of current flow. A neon indicator lamp 197 and a resistor 198 are connected in parallel with the contacts 191 of the relay 189 and provide an indication of whether the contacts 191 are open or closed. When the contacts 191 are closed, current flows through the conductors 171 and 172, the coil 192 and the contacts 191, thereby energizing the coil 192 and holding the power contactor closed, and the indicator lamp 197 is shorted out. When the contacts 191 open, the neon lamp 197 is not shorted out and it is therefore energized. Current then flows through the coil 192 and the lamp 197 and while this current is sufficient to energize the lamp 197, it is not sufficient to energize the coil 192 to actuate the power contactor.

In addition to the foregoing components, the detector shown in FIG. 12 includes a "press to test" feature. This feature comprises a normally open switch 201, a neon lamp 202, and a capacitor 203. It will be apparent that the lamp 202 and the capacitor 203 form a transmitter circuit of the type shown in FIG. 2 of the present application. When the switch 201 is manually closed, the lamp 202 and the capacitor 203 will be placed across the conductors 171 and 172 and will generate pulses in the manner discussed with regard to FIG. 2.

Considering the operation of the detector circuit shown in FIG. 12, assume that the conductors 171 and 172 are connected to the power lines and that no pulses appear on these conductors. The AC voltage is rectified by the rectifier 173, the resistor 174 and the capacitor 176, and the rectified voltage appears across the SCR 187. However, since no pulses appear on the conductors 171 and 172 the SCR 187 is biased off. The contacts 191 of the relay 189 are closed, and the neon indicator lamp 197 is not energized. If, prior to operation of the motor, it is desired to test the operativeness of the detector circuit, the switch 201 is manually closed. Pulses generated by the transmitter consisting of the neon lamp 202 and the capacitor 203 appear on the conductors 171 and 172 and pass through the filter 177, and the pulses are stored on the capacitor 183. When the charge on the capacitor 183 reaches the Zener voltage of the diode 184, the diode 184 conducts, the SCR 187 is triggered to conduction, and current flows through the coil 188 of the relay 189. Energization of the coil 188 opens the contacts 191 and thereby deenergizes the main contactor coil 192. The neon indicator lamp 197 is simultaneously energized indicating that the detector has responded to the pulses generated by the transmitter and has opened the contacts 191. The indicator lamp 197 and the switch 193 may be located on a control panel with the lamp 197 adjacent the switch 193. The switch 193 may, for example, be labeled "push to reset" and these words would be illuminated when the lamp 197 is energized. When the train of pulses from the transmitter has stopped and the charge on the capacitor 183 has drained off through the resistor 182, the SCR 187 may be turned off by momentarily closing the reset switch 193. This action momentarily shorts out the SCR 187 and thus stops current flow through it. The contacts 191 of the relay 189 however remain open after the SCR stops conducting. To return the contacts 191 to the closed position, it is necessary to momentarily close the switch 193 a second time and thereby cause current flow through the coil 188.

Thereafter, when the load is energized, a train of pulses generated by a transmitter connected to the load will actuate the detector similar in the foregoing manner. Once the SCR in the detector is energized, an operator may deenergize it by pressing the reset button 193, but this action will not reclose the main power contactor because of the memory feature of the relay 189. The contacts 191 will remain open while the cause of the overheating is determined, and until the switch 193 is closed a second time.

Figure 13:
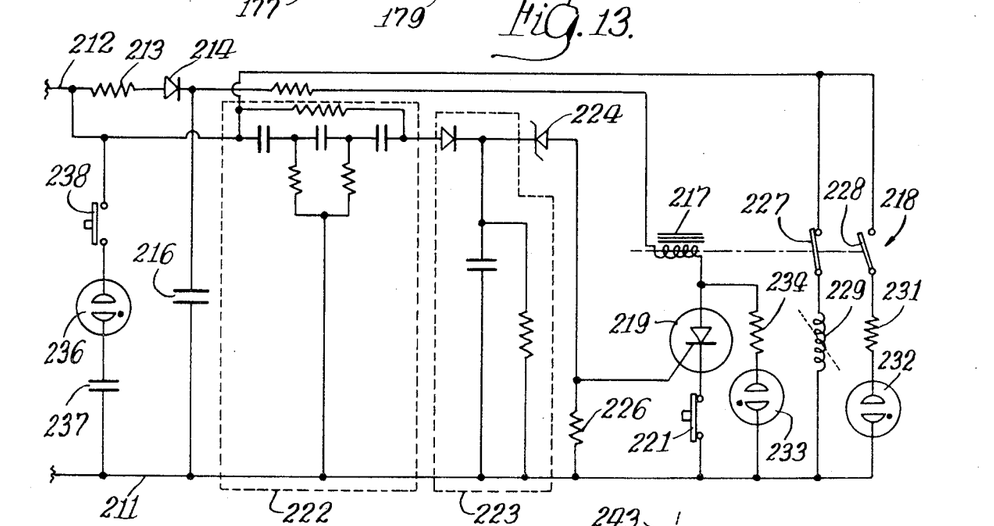

FIG. 13 shows another detector which operates and is constructed generally similar to the detector shown in FIG. 12, the principle difference being in the construction and connections to the relays. The detector shown in FIG. 13 also includes a pair of conductors 211 and 212 which are adapted to be connected across two of the three power lines connecting a three-phase power supply to a three-phase load. A rectifier circuit comprising a resistor 213, a rectifier 214 and a capacitor 216 are connected in series across the two conductors 211 and 212 and rectify the line voltage. The rectified voltage is connected to the coil 217 of a relay 218 and an SCR 219, the coil 217 and the SCR 219 being connected in series with a reset switch 221. Pulses appearing on the two conductors 211 and 212 pass through a filter 222 and an integrator 223, the output of the integrator being connected to a Zener diode 224 and a resistor 226. The gate of the SCR 219 is connected to the junction of the Zener diode 224 and the resistor 226. The relay 218 includes two sets of contacts 227 and 228, the contacts 227 being normally closed and the contacts 228 being normally open. The normally closed contacts 227 are connected across the two conductors 211 and 212 in series with a coil 229 of a power contactor relay, and the normally open contacts 228 are connected across the conductors 211 and 212 in series with a resistor 231 and a neon indicator lamp 232. As in the detector shown in FIG. 12, a neon regulator lamp 233 and a resistor 234 are connected in parallel with the SCR 219, and a test transmitter comprising a neon lamp 236 and a capacitor 237 are connected across the conductors 211 and 212. When it is desired to test the detector, a switch 238 is momentarily closed to thereby cause a train of pulses to be generated on the conductors 211 and 212. The relay 218 is a conventional type wherein the contacts 227 and 228 are in one position when the coil 217 is energized and are in the opposite position when the coil 217 is not energized.

Considering the operation of the circuit shown in FIG. 13, assume that a train of pulses appears on the conductors 211 and 212, these pulses being generated either by the test transmitter or by a transmitter connected to the load. The train of pulses will be passed by the filter circuit 222, and the positive portions will be integrated and stored in the integrator circuit 223. When the potential of the integrator circuit 223 reaches the Zener voltage of the diode 224, the SCR 219 is triggered to conduction and rectified current flows through the coil 217, the SCR 219 and the contacts of the switch 221. Energization of the coil 217 opens the normally closed contacts 227 and closes the normally open contacts 228. When the contacts 227 are closed and the coil 229 of the power contactor is energized by the AC line voltage, the power contactors are closed, but opening of the normally closed contacts 227 deenergizes the coil 229 and thus opens the main power contactors. Closing of the contacts 228 results in energization of the indicator lamp 232 which is again preferably located on a control panel adjacent the switch 221. An operator, seeing the indicator lamp 232 energized, is made aware that the main power contactors are open, and he is alerted that the load may need servicing. After the load has been repaired or replaced, the switch 221 is momentarily opened, thereby cutting off current flow through the SCR 219. The coil 217 is deenergized, the contacts 227 close and energize the coil 229, the power contactor closes, and the contacts 228 open to deenergize the indicator lamp 232.

Figure 14:
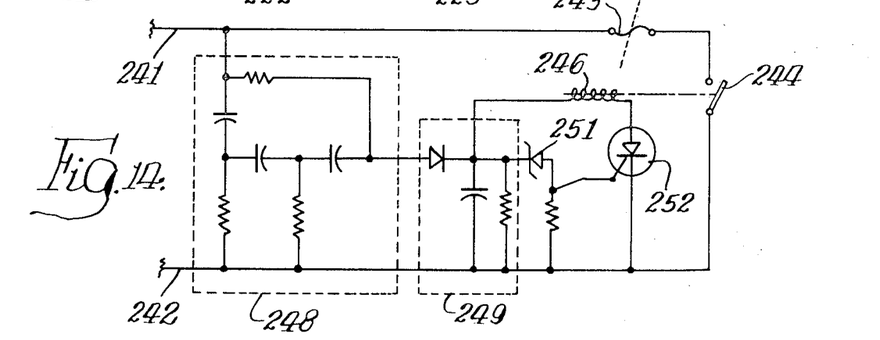

Another pulse detector is illustrated in FIG. 14 which is of the type shown in FIG. 10. The FIG. 14 detector comprises a pair of conductors 241 and 242 which connect the detector to two power lines such as the lines 131 and 132. An indicating plunger type fuse 243, which corresponds to the device 147, is connected across the two conductors 241 and 242 in series with normally open relay contacts 244. The contacts 244 are actuated by a relay winding 246. The detector further includes a filter circuit 248 for removing most of the power line frequency, the filter output being connected to an integrator 249 where the pulses are integrated and stored. When the voltage on the integrator builds up to a predetermined level, a Zener diode 251 conducts and an SCR 252 is triggered to conduction. Current flow through the SCR 252 also flows through the relay coil 246 which is connected in series with the SCR 143.

To summarize the operation of the detector shown in FIG. 14 connected in the system shown in FIG. 10, a train of pulses appearing on the power lines and on the conductors 241 and 242 is passed through the filter 248 to the integrator 249. When the integrator voltage reaches the Zener voltage of the diode 251, the diode 251 conducts and triggers the SCR 252 to conduction, thereby energizing the relay coil 246 and closing the switch 244. Closure of the latter switch places the fuse 243 directly across the two power lines, thereby causing it to blow and also to actuate a plunger which is mechanically connected to the two switches 141 and 144 (shown in FIG. 10). As previously explained, opening of the switch 141 results in the load being disconnected from the power supply, and closure of the switch 144 results in the alarm 142 being energized. As is also true of the other detectors disclosed herein, a train of pulses over approximately 30 cycles of the AC power line voltage is sufficient to cause the Zener diode 251 to conduct.

From the foregoing description, it will be apparent that a novel apparatus has been provided. A transmitter embodying the invention has the advantages of being relatively simple, small sized, extremely rugged and dependable, and inexpensive to manufacture and install. Because of its small size and because it does not require separate conductors to connect it to a detector, the transmitter is ideally suited for use in an electric motor protection circuit because the transmitter, being very small may be readily mounted within the stator of the motor, closely adjacent the windings. In such a system, the detector could be located at a remote location adjacent a power supply, or at a central control station. A transmitter in a motor as described is capable of giving long and reliable service, and it will operate well with the low-impedance loading of the power system because of the very narrow width pulses.

In the foregoing description, the switch connected to control energization of the transmitter has been referred to as a heat responsive switch. It will be obvious, however, that the transmitter may be used in conjunction with a switch that is constructed to respond to other physical conditions. For example, the transmitter could be used in a home or building protection system, the switch being constructed to respond to heat or smoke, as when a home or building is on fire. The transmitter could be part of a burglar-detecting system and include a switch which is constructed to be actuated in the event a window or door were open in an unauthorized manner. In such a home or building protection system, the pulse generated by the transmitter would be connected to flow along the AC power lines of the home or building to a detector and an alarm system.

I claim:

1. In an alternating current power supply system including an AC power supply, an AC load, and a pair of power supply lines connecting said load to said supply for energization of said load, the improvement comprising a pulse transmitter connected between said power lines in path parallel with said load, said transmitter comprising a potential breakdown device connected to one of said lines, said breakdown device having a firing voltage and an extinguishing voltage which is lower than said firing voltage and said breakdown device conducting current when the potential thereacross rises to said firing voltage and blocking current flow when the voltage thereacross falls to said extinguishing voltage, and a potential storage device connecting said breakdown device with the other of said lines and forming the only circuit path for any current flow to said breakdown device while said breakdown device is conducting, whereby during operation said breakdown device fires and briefly conducts current when the voltage thereacross reaches said firing voltage, such current flow changing the voltage to which said breakdown device is charged and thus reducing the voltage drop across said breakdown device to said extinguishing voltage, said current flow resulting in a pulse which is superimposed on the AC voltage on said power supply lines.

2. Apparatus as in claim 1, and further including a detector connected between said power lines, said detector being responsive to said pulses generated by said transmitter.

3. In an alternating current power supply system including an AC power supply, an AC load, and a pair of power supply lines connecting said load to said supply for energization of said load, the improvement comprising a pulse transmitter connected between said power lines in parallel with said load, said transmitter comprising a potential breakdown device and a potential storage device connected in series with said breakdown device, said breakdown device having a firing voltage and an extinguishing voltage which is lower than said firing voltage, whereby during operation said breakdown device fires and conducts current when the voltage thereacross reaches said firing voltage, such current flow changing the voltage to which said capacitor is charged and thus reducing the voltage drop across said breakdown device to said extinguishing voltage, said current flow resulting in a pulse which is superposed on the AC voltage on said power supply lines, and further including a switch connected in circuit with said transmitter for rendering said transmitter effective to generate pulses in response to an ambient physical condition.

4. Apparatus as in claim 3, wherein said switch is connected in series with said breakdown device and said storage device.

5. Apparatus as in claim 3, wherein said switch is connected in parallel with said breakdown device.

6. Apparatus as in claim 3, wherein said physical condition is the ambient temperature.

7. Apparatus as in claim 1, wherein said breakdown device comprises a neon lamp.

8. Apparatus as in claim 7, wherein said transmitter further comprises a diode connected in parallel with said neon lamp.

9. In an alternating current power supply system including an AC power supply, an AC load, and a pair of power supply lines connecting said load to said supply for energization of said load, the improvement comprising a pulse transmitter connected between said power lines in parallel with said load, said transmitter comprising a potential breakdown device and a potential storage device connected in series with said breakdown device, said breakdown device having a firing voltage and an extinguishing voltage which is lower than said firing voltage, during operation said breakdown device fires and conducts current when the voltage thereacross reaches said firing voltage, such current flow changing the voltage to which said capacitor is charged and thus reducing the voltage drop across said breakdown device to said extinguishing voltage, said current flow resulting in a pulse which is superposed on the AC voltage on said power supply lines, said breakdown device comprising a silicon-controlled rectifier connected in series with said storage device, and voltage responsive means connected between the gate of said rectifier and a point between said rectifier and said storage device, said means triggering said rectifier to conduction at a predetermined voltage drop thereacross.

10. Apparatus as in claim 9, wherein said voltage responsive means comprises a DIAC.

11. In an alternating current power supply system including an AC power supply, an AC load, and a pair of power supply lines connecting said load to said supply for energization of said load, the improvement comprising a pulse transmitter connected between said power lines in parallel with said load, said transmitter comprising a potential breakdown device and a potential storage device connected in series with said breakdown device, said breakdown device having a firing voltage and an extinguishing voltage which is lower than said firing voltage, whereby during operation said breakdown device fires and conducts current when the voltage thereacross reaches said firing voltage, such current flow changing the voltage to which said capacitor is charged and thus reducing the voltage drop across said breakdown device to said extinguishing voltage, said current flow resulting in a pulse which is superposed on the AC voltage on said power supply lines, said breakdown device comprising a TRIAC connected in series with said storage device and voltage responsive means connected between the gate of said TRIAC and a point between said rectifier and said storage device, said means triggering said rectifier to conduction at a predetermined voltage drop thereacross.

12. Apparatus as in claim 11, wherein said voltage responsive means comprises a neon lamp.

13. Apparatus as in claim 1, wherein said breakdown device comprises a pair of electrodes which form a spark gap therebetween.

14. In an alternating current power supply system including an AC power supply, an AC load, and a pair of power supply lines connecting said load to said supply for energization of said load, the improvement comprising a pulse transmitter connected between said power lines in parallel with said load, said transmitter comprising a potential breakdown device and a potential storage device connected in series with said breakdown device, said breakdown device having a firing voltage and an extinguishing voltage which is lower than said firing voltage, whereby during operation said breakdown device fires and conducts current when the voltage thereacross reaches said firing voltage, such current flow changing the voltage to which said capacitor is charged and thus reducing the voltage drop across said breakdown device to said extinguishing voltage, said current flow resulting in a pulse which is superposed on the AC voltage on said power supply lines, said breakdown device comprising a TRIAC connected in series with said storage device and a DC voltage supply connected to the gate of said TRIAC.

15. In an alternating current power supply system including an AC power supply, an AC load, and a pair of power supply lines connecting said load to said supply for energization of said load, the improvement comprising first and second pulse transmitters connected between said power lines in parallel with each other and with said load, each of said transmitters comprising a potential breakdown device and a potential storage device, said breakdown device having a firing voltage and an extinguishing voltage which is lower than said firing voltage, said breakdown device comprising a silicon-controlled rectifier connected in series with said storage device, and voltage responsive means connected between the gate of said rectifier and a point between said rectifier and said storage device, said voltage responsive means triggering said rectifier to conduction at said firing voltage, said rectifier of said first transmitter being connected to conduct current in one direction and said rectifier of said second transmitter being connected to conduct current in the opposite direction, whereby said first transmitter is operative to conduct current and generate a pulse when the power line voltage has one polarity and said second transmitter is operative to conduct current and generate a pulse when the power line voltage has the opposite polarity.

16. Apparatus as in claim 15, and further including a normally open switch connected in parallel with said transmitters for discharging said potential storage devices of said transmitters.